United States Patent [19]

Krude

[11] Patent Number: 5,460,573
[45] Date of Patent: Oct. 24, 1995

[54] TRIPOD JOINT HAVING CENTERING PORTION

[75] Inventor: Werner Krude, Neunkirchen-Wolperath, Germany

[73] Assignee: GKN Automotive AG, Lohmar, Germany

[21] Appl. No.: 65,818

[22] Filed: May 21, 1993

[30] Foreign Application Priority Data

May 26, 1992 [DE] Germany ............ 42 17 332.9

[51] Int. Cl.⁶ .................................................. F16D 3/205
[52] U.S. Cl. ............. 464/111; 464/123; 464/905
[58] Field of Search ....................... 464/83, 85, 123, 464/124, 905, 111

[56] References Cited

U.S. PATENT DOCUMENTS

| | | | |
|---|---|---|---|
| 4,178,778 | 12/1979 | Orain | 464/123 X |
| 4,320,632 | 3/1982 | Dore | 464/123 X |
| 4,421,196 | 12/1983 | Orain | 464/111 X |
| 4,507,100 | 3/1985 | Dore et al. | 464/124 X |
| 4,592,736 | 6/1986 | Magiavacchi | 464/111 |
| 4,904,227 | 2/1990 | Sasaki et al. | 464/123 X |
| 5,290,202 | 3/1994 | Orain | 464/905 X |

FOREIGN PATENT DOCUMENTS

| | | |
|---|---|---|
| 0335781A | 10/1989 | European Pat. Off. . |
| 477074 | 3/1992 | European Pat. Off. ............ 464/111 |
| 1864554 | 11/1962 | Germany . |
| 1903600 | 9/1969 | Germany . |
| 2530670 | 1/1976 | Germany . |
| 2528536A1 | 12/1976 | Germany . |
| 2240436 | 2/1978 | Germany . |
| 3628371 | 10/1990 | Germany . |
| 3030611 | 2/1988 | Japan ................................ 464/111 |
| 0297820 | 12/1988 | Japan ................................ 464/111 |
| 565222 | 11/1944 | United Kingdom . |
| 2256256 | 12/1992 | United Kingdom . |

*Primary Examiner*—John J. Calvert
*Attorney, Agent, or Firm*—Harness, Dickey & Pierce

[57] ABSTRACT

A tripod joint has an outer joint part with at least two circumferentially distributed longitudinally extending tracks to receive rollers. The outer part is non-rotatingly connected to a first driveshaft. An inner joint part is coupled with the outer joint part. The inner joint part has radial arms which engage the tracks and on which the rollers are rotatably and radially movably supported. The inner part is non-rotatingly connectable to a second driveshaft. The outer joint part further includes an outer annular member directly and firmly connected to the first driveshaft. Track elements directly guide the rollers, and resilient intermediate elements are arranged between the two parts. A mutual centering mechanism is provided between the annular member of the outer joint part.

19 Claims, 11 Drawing Sheets

TRIPOD JOINT HAVING CENTERING PORTION

BACKGROUND OF THE INVENTION

The present invention relates to tripod joints. The joints includes an outer joint part, non-rotatingly connected to a first driveshaft, with three circumferentially distributed longitudinally extending tracks to receive rollers. An inner joint part is included which has three radial arms which engage the tracks and on which the rollers are rotatably and radially movably supported. The inner part is non-rotatingly connectable to a second driveshaft. The outer joint part includes an outer annular member directly and firmly connected to the first driveshaft, track elements directly guiding the rollers, and resilient intermediate elements which are arranged between the two and through which torque may be transmitted. The terms of first driveshaft and second driveshaft as used in this context analogously refer to other rotating drive parts such as drive flanges, wheel hubs and the like.

Tripod joints differ from ideal constant velocity universal joints in that, when the joint is in an articulated condition, the transmission of power does not take place in the angle-bisecting plane between the two joint axes. In tripod joints, power transmission takes place in the plane of the tripod arms so that contact takes place in the plane perpendicular to one of the driveshafts.

Nevertheless, even with tripod joints, constant velocity occurs between the first driveshaft and the second driveshaft; the angular speed of the two shafts is always the same. This is achieved as a result of an orbital movement between the outer joint part and inner joint part during rotation of the articulated joint. Apart from other influences, especially friction-loaded rolling movement of the tripod rollers in the tracks of the outer joint part, which influences will not be discussed here in greater detail, the above-mentioned orbital movement also constitutes a negative influencing factor with respect to the NVH behavior (Noise, Vibration, Harshness). This negative influence is particularly pronounced in the case of high-speed shafts and joints. If the shafts are used in vehicles, they adversely affect the driving comfort due to the resulting vibration excitation and noise development.

DE-AS 22 40 436 (U.S. Pat. No. 3,817,057) already proposes joints of the initially mentioned type. Here rubber-elastic material members are provided between the outer annular member and the track elements. It is the purpose of such elements to resiliently dampen rotational impacts in the driveline. However, the problem of an additional vibration excitation resulting from the orbital movement cannot be eliminated in any way by such a measure. On the contrary, this phenomenon very widely occurs with joints of this type as well and leads to the above-mentioned problems which have to be considered separately.

DE-OS 25 30 670, issued Jan. 29, 1976, describes joints where mutual centering means are provided between the outer joint part and the inner joint part. These are designed as ball/cylinder assemblies or ball/calotte assemblies, but the outer joint part is designed in one piece. To ensure functioning in the case of a tripod joint, the contact between the rollers and recesses must be of a resilient nature. This is achieved by lining the recess with an elastomer. Otherwise, without the lining, the joint would not be capable of articulation. Such a design with resilient tracks does not meet the requirements of practical applications.

Finally, DE 19 03 600, proposes a joint with four poles. Here the centering means includes a journal/ball assembly at the outer joint part and a calotte assembly at the inner joint part. In this case, too, the recesses of the outer joint part are directly covered with a resilient material as otherwise the joint would not be capable of articulation. This joint cannot be regarded as meeting the requirements of practical applications either since high torques and high service life values cannot be achieved with such a design.

SUMMARY OF THE INVENTION

It is an object of the present invention to provide a tripod joint which reduces the disadvantageous vibration characteristics caused by the joint kinematics and resulting from relative orbital movements between the inner and outer joint parts when the joint rotates in the articulated condition.

In accordance with the invention, means to ensure mutual centering is provided between the annular member of the outer joint part and the inner joint part. In spite of shaft centering, which should in fact lead to a non-uniform transmission of power between the shafts, uniformity is maintained even with this joint due to the displaceability of the track elements relative to the annular member.

Thus, relatively large masses, especially the driveshaft rotating with the inner joint part, are ensured to rotate in a centered way even when the joint is articulated. The necessary compensation of orbital movements is effected by the permissible relative movement between the track elements and the annular member of the outer joint part. The intermediate elements required for this purpose are preferably provided in the form of resilient members which at the same time have damping characteristics. In a preferred embodiment, the resilient members used for resiliently returning the displaced track elements relative to the annular member also, at the same time, serve to transmit torque between the parts. Therefore, below, the intermediate elements are also referred to as supporting elements. To limit any possible simultaneously rotation between the outer joint part and inner joint part, additional anti-rotation stops are provided which act either between the track elements and the annular member of the outer joint part or between the inner joint part and the track elements.

Preferably, the mechanism for mutually centering the annular member of the outer joint part and the inner joint part includes, between the attached arms, a part spherical surface on the inner joint part which directly cooperates with a centering mechanism at the annular member. The surface parts of the inner joint part can easily be designed to be spherical without involving substantial design expenditure or substantial disadvantages.

For friction reducing purposes it is possible to provide the centering means with special coatings or intermediate elements such as spherical cups or the like.

According to a first embodiment, the centering mechanism of the annular member is in the form of radially inwardly directed longitudinally extending webs engaging the spaces between each two of the tripods arms of the inner joint part. The effective contact faces of these webs are designed as cylindrical portions. The webs may be directly connected to the cylindrical annular member of the outer joint part. To provide additional stability, the webs, at one end, may be formed on to a joint base whose outside is attached to a shaft journal.

The above design of the centering mechanism of the annular member presupposes that the individual track elements are designed to be independent of one other. The track elements may have the form of formed plate metal parts or cut profiled pieces and form the tracks for one single tripod roller.

According to a second embodiment, the centering mechanism of the annular member is designed as an axially extending coaxial centering sleeve. The sleeve includes longitudinally extending slots which enable the arms of the inner joint part to pass through.

Via a common end part, especially a joint base, the centering sleeve may be designed to be integral with the annular member. The slots may initially be open at one end to enable axial introduction of the inner joint part. However, for reinforcing purposes and to ensure mutual stability, it is possible to provide a connecting annular element closing said slots. Alternatively, the axial length of the slots may be limited so that a connecting annular element is obtained towards the open end of the outer joint part. In the process, after having introduced the inner joint part into the slots of the centering sleeve, the tripod rollers are mounted on the tripod arms or the width of the slots is such that the tripod arms, together with the mounted rollers, may be introduced into the slots from the inside.

The annular element is designed such that the pivot movement of the driveshaft connected to the inner joint part is not inhibited. Instead of providing the above-mentioned reinforcing means at the ends of the centering sleeve relative to one another, it is possible to support the ends of the centering sleeve directly relative to the annular member after the track elements and resilient transmission elements have been inserted into the annular member of the outer joint part. The above design of the centering mechanism at the annular member also enables the individual track elements to be connected to form one single closed annular part.

According to a third embodiment of the centering mechanism, it includes a coaxial journal. The journal is fixed to the annular member or to the driveshaft firmly connected with the annular member. An externally spherical ring is axially movably guided on the journal. The ring pivotably engages a central calotte face in the inner joint part. The above design of the centering mechanism again enables the individual track elements to be connected to form one closed annular part.

The first mentioned individual track elements, in their rest position, when the joint is in the aligned position, are able to rest with their outside against the annular member of the joint. Also, the track elements may be circumferentially and possibly radially inwardly resiliently supported relative to the annular member. The track element design, in the form of the next mentioned closed ring, requires a radial movement and a circumferential movement out of a central position at an aligned joint.

If, with the joint being driven in the articulated condition, the inner joint part is rotatingly articulated relative to the outer joint part, an apparent oscillating change occurs in the angle of the tripod arms of the inner joint part relative to one another in the axial projection in the direction of the axis of the outer joint part. Where track elements are designed independent of one another, this may be compensated for by oscillating circumferential displacements of the track element in the annular member. Where track elements are connected to one another to form an annular part, this change in angle may be accommodated by an orbital movement of the annular track element part relative to the axis of the annular member.

The annular member does not necessarily have to be designed as a cylindrical member, however, similarly to the one-piece annular track element part, it may include radial formations. The intermediate elements are able to support themselves more easily in the circumferential direction on the radial formations. Thus both parts may be produced as deep-drawn parts or as cut profiled elements.

To the extent that the radial movability of the track elements relative to the annular member was mentioned above, it is possible for the tripod rollers to be radially held in the track elements so that they participate in the respective movements of the track elements. The compensating movements relative to the inner joint part are carried out through displacement on the tripod arms.

The described invention includes joints where the tripod rollers are supported directly and coaxially on the tripod arms, where the displacement of the rollers relative to the inner joint part can only take place in the longitudinal direction of the arms, as well as joints where the tripod rollers cannot only be displaced on the tripod arms in their longitudinal direction, but can also carry out a pivot movement relative to the tripod arms as a result of suitable intermediate elements. The various designs of such joints are known, examples being DE 39 36 601, DE 37 16 962 (U.S. Pat. No. 4,786, 270, and DE 28 31 044 (U.S. Pat. No. 4,379,706).

From the following detailed description taken in conjunction with the accompanying drawings and subjoined claims, other objects and advantages of the present invention will become apparent to those skilled in the art.

BRIEF DESCRIPTION OF THE DRAWINGS

Below, the invention will be explained in greater detail with reference to the drawings.

DETAILED DESCRIPTION OF THE PREFERRED EMBODIMENTS

Figure 1:
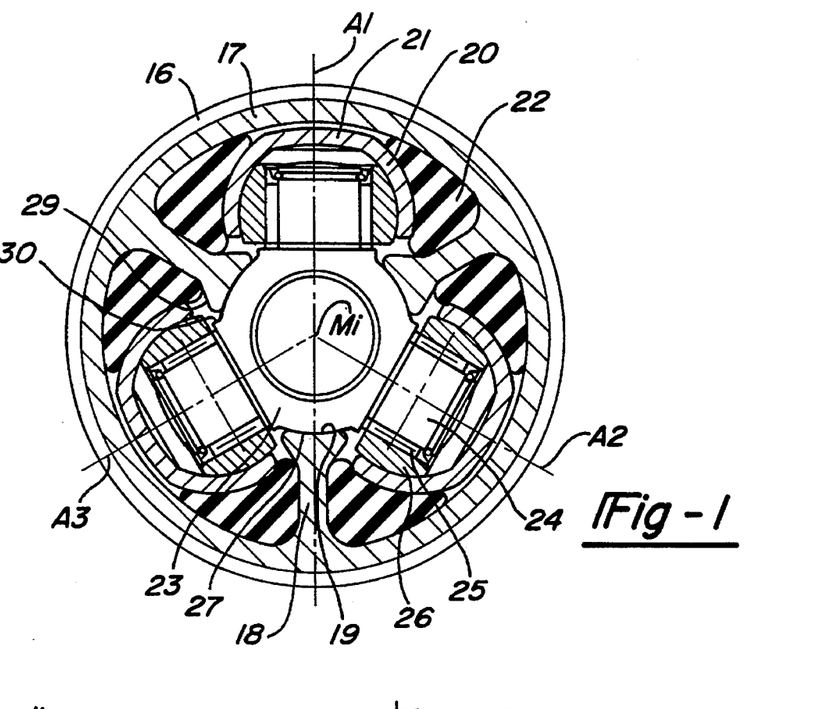
FIG. 1 is a cross-section view through a first embodiment of a joint according to the present invention.
Figure 2:
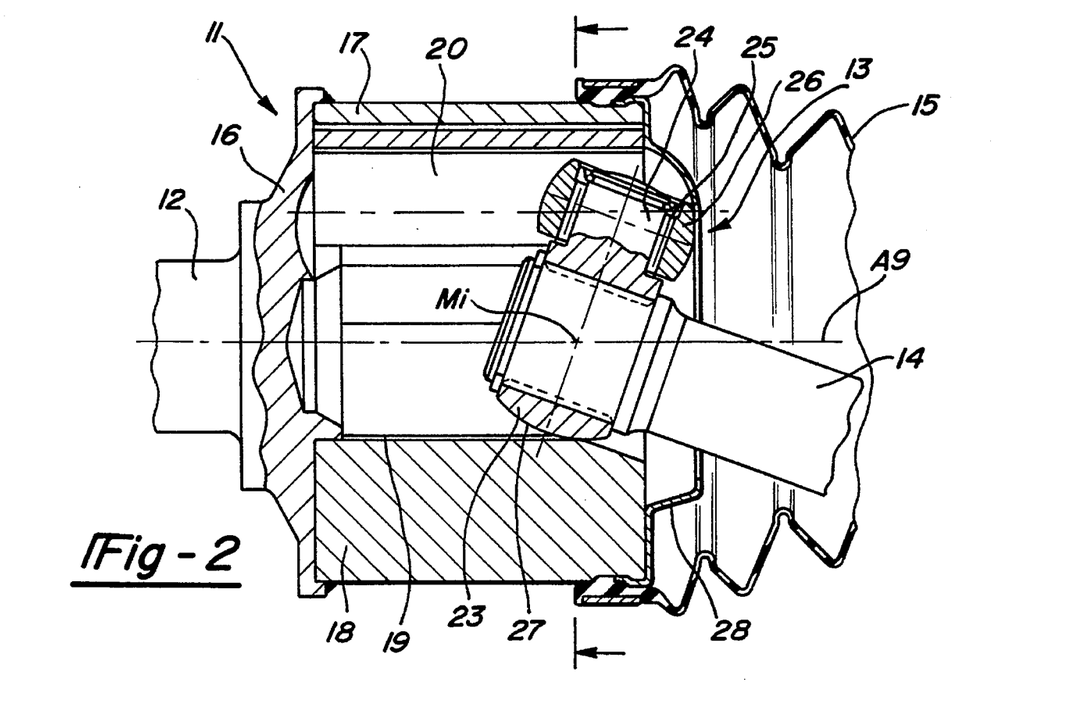
FIG. 2 is a longitudinal section view through a joint according to FIG. 1, with the joint in an articulated condition.

FIGS. 1 and 2, which will be described jointly below, show the outer joint part 11 with a directly formed-on first driveshaft 12 and the inner joint part 13 with an inserted second driveshaft 14. A convoluted boot 15 with a securing mechanism, not explained in greater detail, is partially shown in longitudinal section.

The outer joint part includes a solid base 16 which is integrally connected to the first driveshaft 12. An annular member 17 is inserted into, and welded to, the base. Three circumferentially distributed, longitudinally extending webs 18 extend radially inwardly from the annular member. On their insides, the webs 18 include cylindrical portions or guiding faces 19 for the inner joint part. Three approximately U-shaped track elements 20 are inserted into the outer joint part. The track elements 20 are uniformly circumferentially distributed in the outer part. The track elements 20 have radial play relative to the annular member 17 and are supported on the annular member 17 and webs 18 via resilient supporting members 22 arranged in pairs. A radial distance or gap is identifiable between the head region 21 of the track elements 20 and the annular member 17.

The inner joint part 13 includes an annular central member 23 into which is inserted the second driveshaft 14. The means for non-rotatingly connecting and axially securing the inner joint part and driveshaft relative to one another will not be discussed in detail. Three circumferentially distributed tripod arms 24 are attached to the central member 23. The tripod rollers 26 are rotatably supported on the tripod arms 24 via needle bearings 25. The means for axially securing the needle bearings on the tripod arms will not be discussed in greater detail. The tripod rollers 26 are axially movable on the tripod arms 24 relative to the respective arm axis via the needle bearings 25. Between each of the tripod arms 24 the central member 23 includes a guiding face 27. The guiding face has a spherical portion which cooperates with the guiding faces 19 of the webs.

In FIG. 1, the inner joint part and outer joint part are illustrated with their axes being in the extended position. In FIG. 2, their axes are in the articulated condition. The axial travel of the inner joint part relative to the outer joint part is limited by a stop. The stop includes a plate metal element 28 is positioned on the annular member. The webs 18, in the region of the guiding faces 19, are provided with stop edges which cooperate with corresponding stops 30 in the base region of the tripod arms 24 in the case of relative rotation of the joint under overload torque. The center $M_i$ of the tripod, predetermined by the point of intersection of the arm axes $A_1$–$A_3$, is always centered on the axis $A_G$ of the outer joint part.

Figure 3:
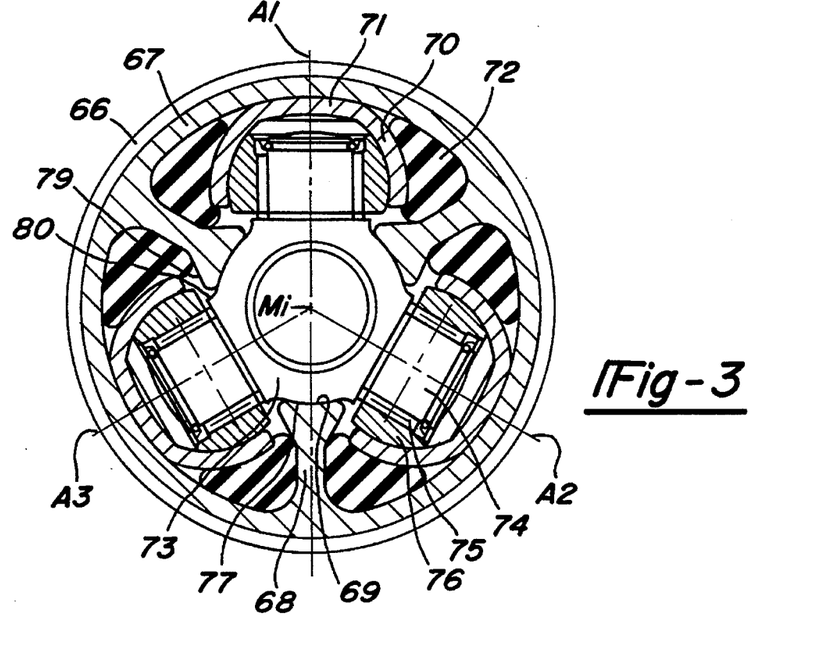
FIG. 3 is a cross-section view through a second embodiment of a joint according to the present invention.
Figure 4:
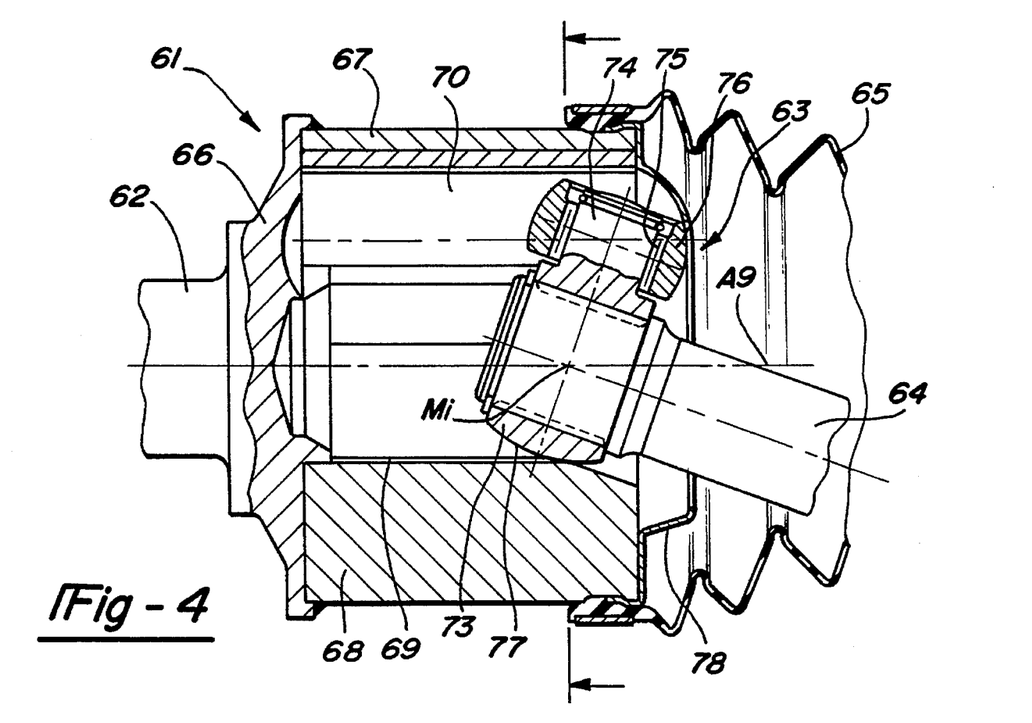
FIG. 4 is a longitudinal section view through a joint according to FIG. 3, with the joint in an articulated condition.

In FIGS. 3 and 4, the reference numbers of any details corresponding to those shown in FIGS. 1 and 2, have been increased by 50. To that extent, reference is made to the description of FIGS. 1 and 2. In deviating from the illustration in FIGS. 1 and 2, the track elements 70 of the joint shown in cross-section in the extended condition in FIG. 3 are supported via their head regions 71 directly on the annular member 67.

Figures 5, 5A:
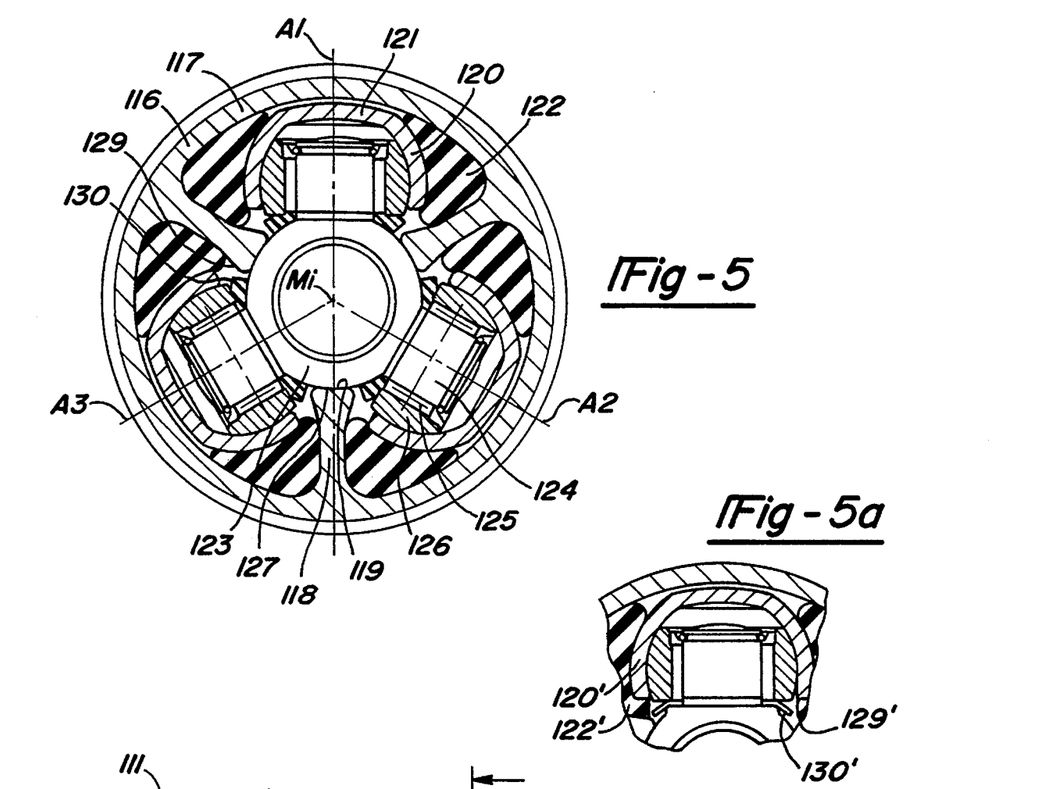
FIG. 5 is a cross-section view through a third embodiment of a joint similar to FIG. 1 with anti-rotation stops.
FIG. 5a is a view of a trunnion like FIG. 5 of an additional embodiment.
Figure 6:
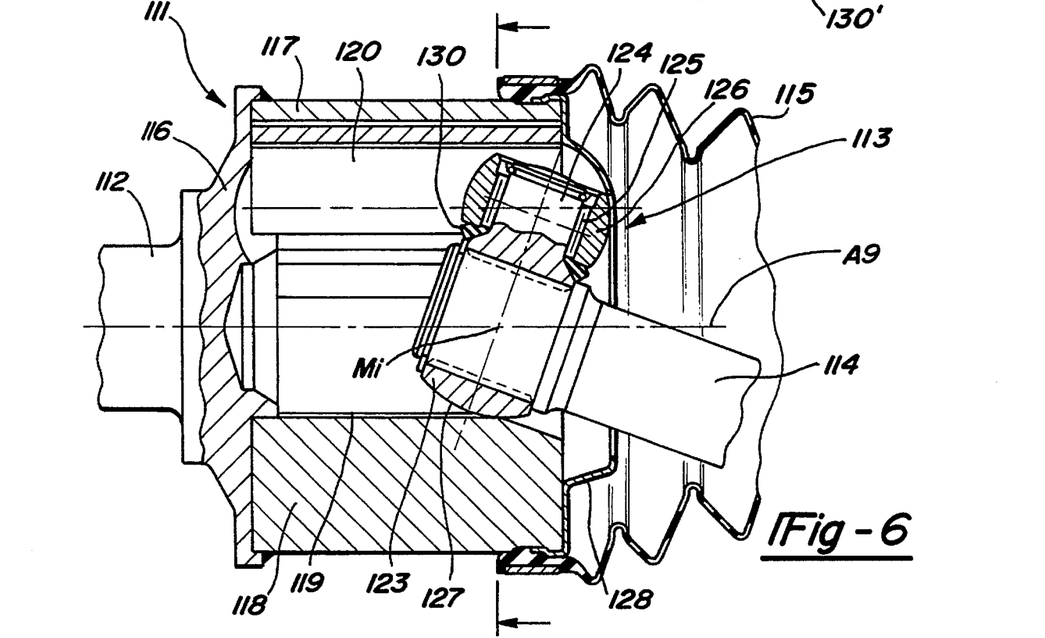
FIG. 6 is a longitudinal section view through a joint according to FIG. 5, with the joint in an articulated condition.

In FIGS. 5 and 6, the reference numbers of any details corresponding to those shown in FIGS. 1 and 2 have been increased by 100. To that extent, reference is fully made to the description of FIGS. 1 and 2. FIGS. 5 and 6 deviate from FIGS. 1 and 2 in that additional resilient annular members 130 cooperating with the stop faces 129 at the webs have been slid on to the arms.

In FIG. 5a, where a tripod arm detail is shown, any details corresponding to those of the main Figure have been given the same reference numbers, but with the addition of an apostrophe ('). However, the supporting elements 122' differ in that, on the inside, they are taken further around the track elements 120'. The stop elements 130' are not provided in the form of plastic parts but plate metal parts.

Figure 7:
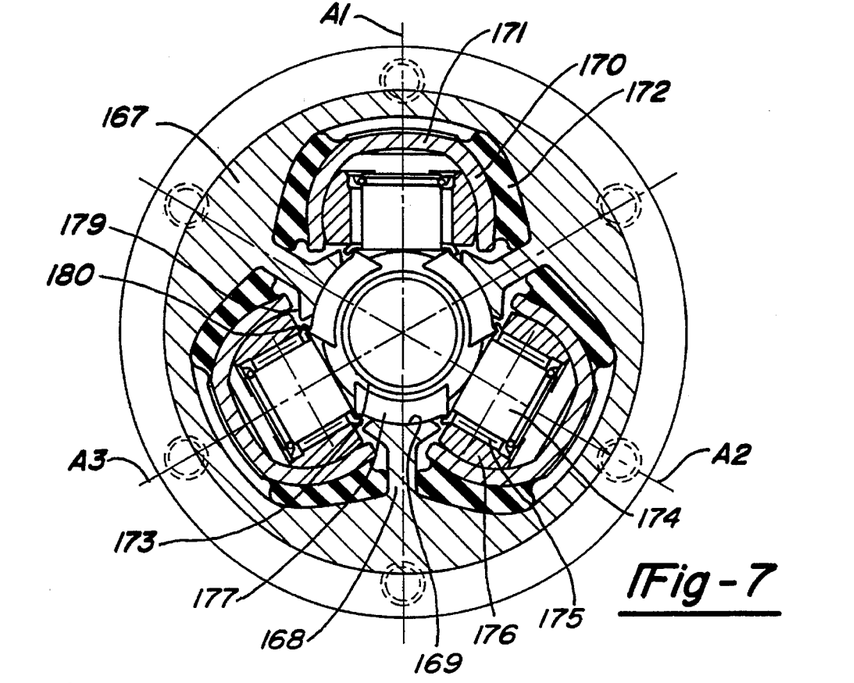
FIG. 7 is a cross-section view through a fourth embodiment of a joint according to the present invention.
Figure 8:
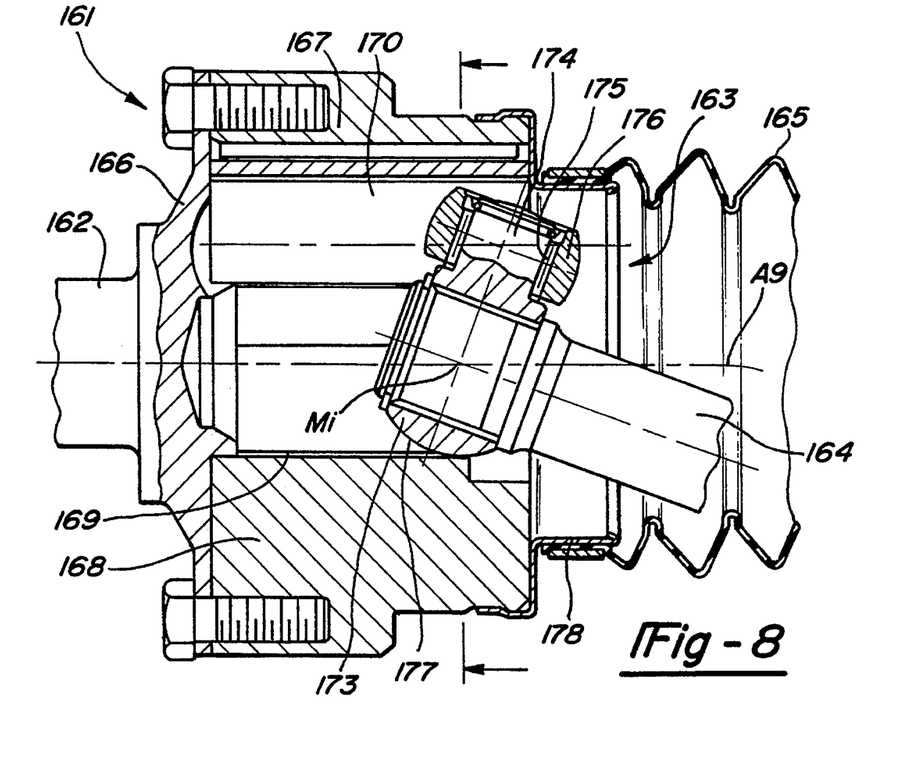
FIG. 8 is a longitudinal section view through a joint according to FIG. 7, with the joint in an articulated condition.

In FIGS. 7 and 8, the reference numbers of any details corresponding to those shown in FIGS. 1 and 2 have been increased by 150. To that extent, reference is fully made to the description of FIGS. 1 and 2. In deviating from FIGS. 1 and 2, the base 166, in this embodiment, is bolted to the annular member 167. Further differences in shape are not of any significant nature.

Figure 9:
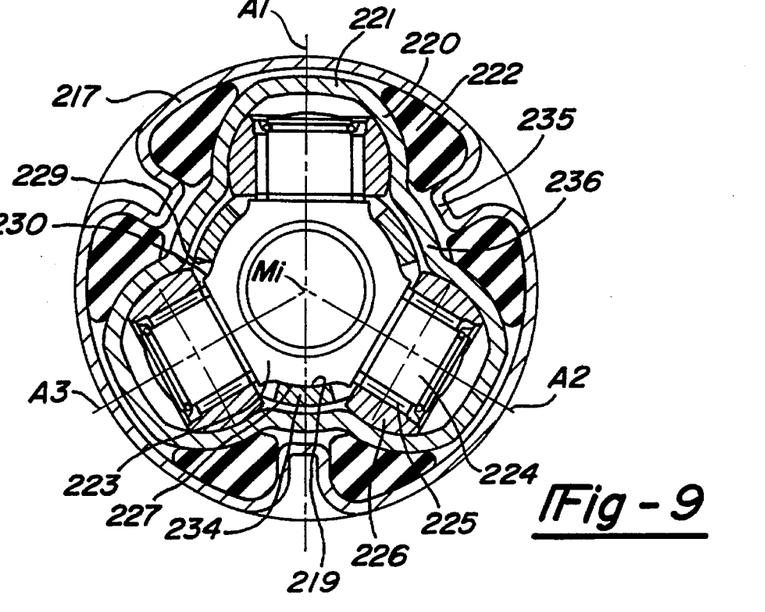
FIG. 9 is a cross-section view through a another embodiment of a joint according to the present invention with a sleeve-like centering mechanism.
Figure 10:
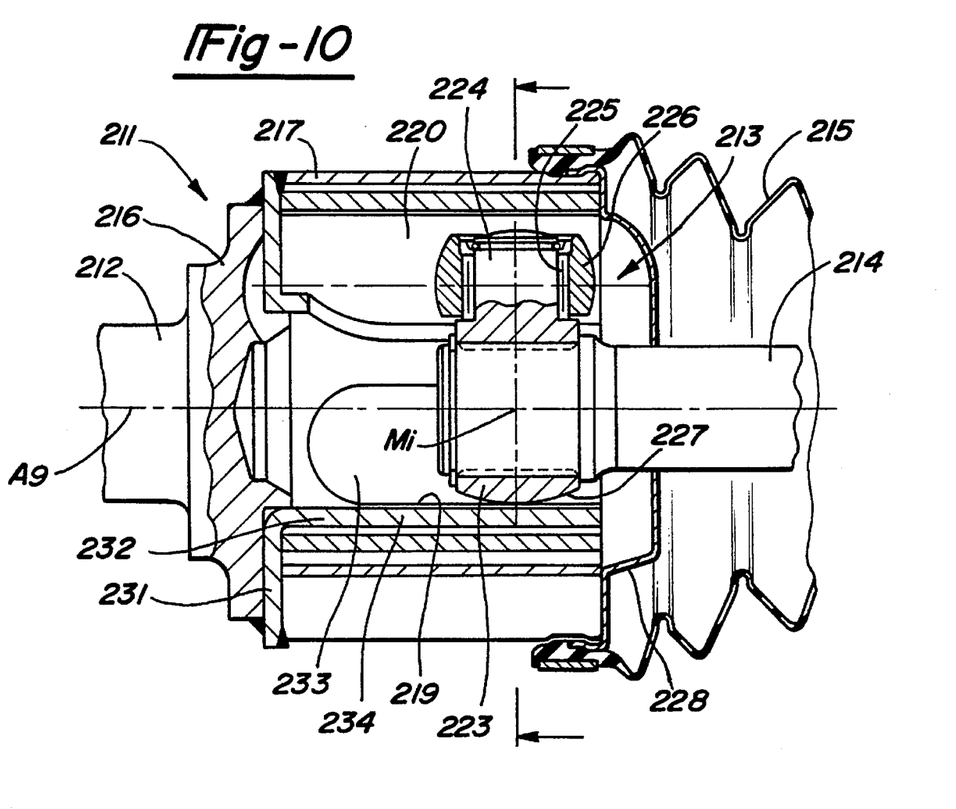
FIG. 10 is a longitudinal section view through a joint according to FIG. 9, with the joint in an articulated condition.

FIGS. 9 and 10 which will be described jointly below, show the outer joint part 211 with a directly formed-on first driveshaft 212. The inner joint part 213 includes an inserted second driveshaft 214. The convoluted boot 215 is partially shown in the longitudinal section and its securing means will not be described in greater detail.

As far as details are concerned, the outer joint part has a solid base 216 which is connected to the first driveshaft 212. An end plate 231, designed to be integral with a guiding sleeve 232, is welded to an annular member 217 at the shaft end. The base 216 is directly welded to the end plate 231. The guiding sleeve 232 is provided with circumferentially distributed slots 233 between which the remaining web-like guiding regions 234 form inner cylindrical guiding faces 219. The annular member 217 has a uniform wall thickness and comprises individual radial indentations 235. The annular member 217 includes inserted track elements 220 which, via connections regions 236, are connected to one another to form a closed annular element. The end faces 221 of the track elements 220 are arranged at a radial distance from the annular member 217. The track elements 220 are circumferentially and radially supported, via resilient supporting members 222 arranged in pairs, on the drawn-in regions 235 of the annular member 217. The intermediate regions 236 of the track elements, towards the inside, are arranged at a radial distance from the guiding regions 234 of the sleeve element 232.

The inner joint part includes an annular central member 223 into which the second driveshaft 214 is inserted. The means for non-rotatingly connecting and axially securing the inner joint part and driveshaft relative to one another will not be discussed in detail. Three circumferentially distributed tripod arms 224 are attached to the central member 223. The tripod rollers 226 are rotatably supported on the tripod arms 224 via needle bearings 225. The means for axially securing the needle bearings on the tripod arms are not discussed in greater detail. The tripod rollers 226 are axially movable on the tripod arms 224, via the needle bearings 225, relative to the respective arm axis. Between each of the tripod arms 224 the central member 223 includes a guiding face 227. The guiding face 227 has a spherical shaped portion which cooperates with the guiding faces 219 of the webs. The axial travel of the inner joint part relative to the outer joint part is limited by a stop of a tripod roller 226 at a plate metal element 228 positioned on the annular member. The guiding regions 234 are provided with stop edges 229 which cooperate with corresponding stops 230 in the base region of the tripod arm 224 upon relative rotation of the joint under overload torque. The center $M_i$ of the tripod, predetermined by the point of intersection of the arm axes $A_1$–$A_3$, is always centered on the axis $A_G$ of the outer joint part.

Figure 11:
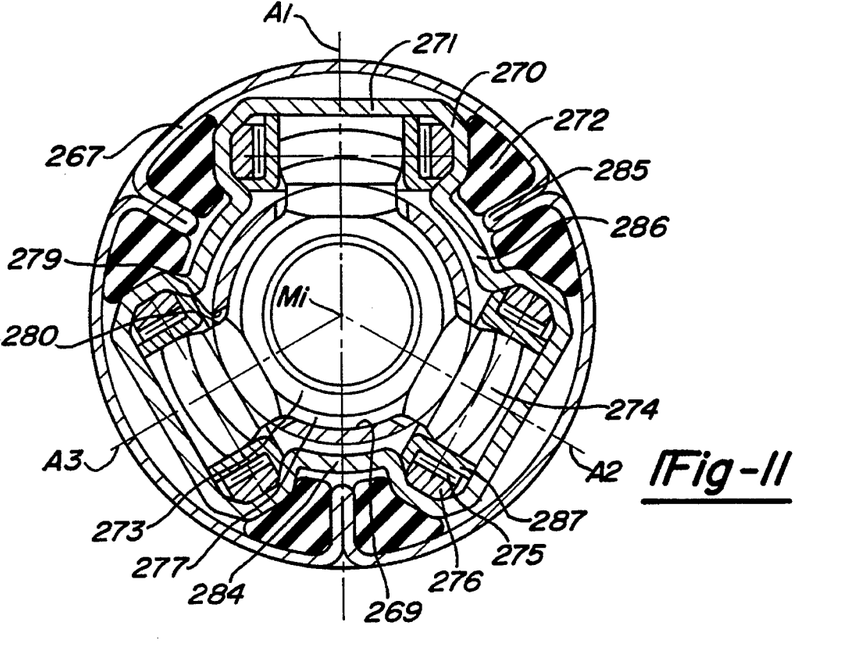
FIG. 11 is a cross-section view through another embodiment of a joint according to the present invention with a sleeve-like centering mechanism.
Figure 12:
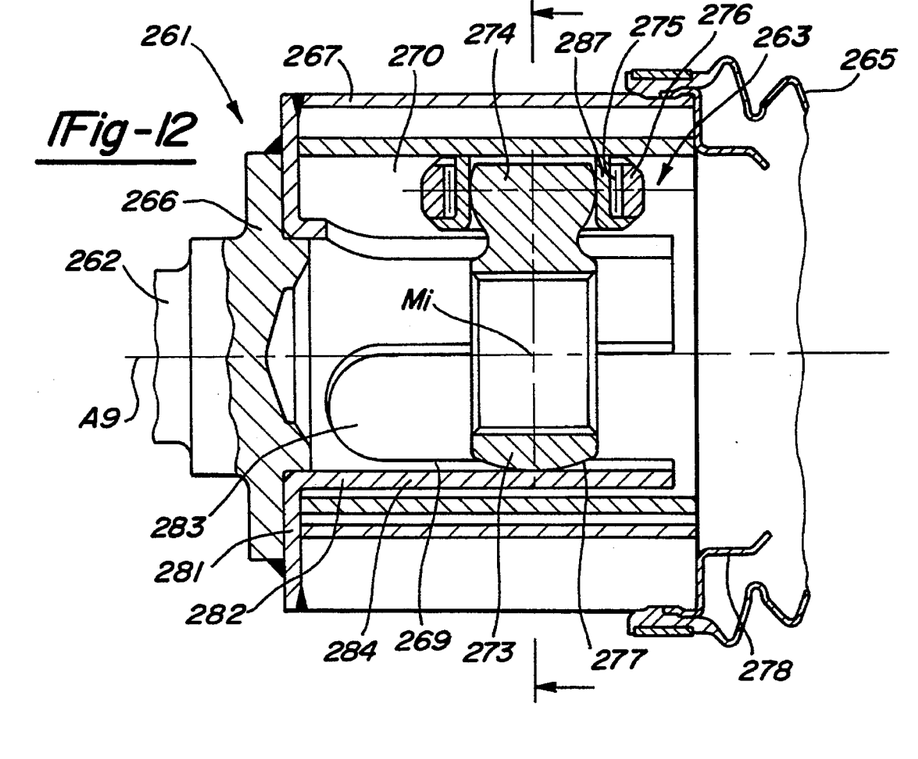
FIG. 12 is a longitudinal section view through a joint according to FIG. 11, with the joint in an extended condition.

In FIGS. 11 and 12, the reference numbers of any details corresponding to those shown in FIGS. 9 and 10 have been increased by 50. To that extent, reference is made in full to the contents of the description of FIGS. 9 and 10. There exist slight differences regarding the shape of the annular member 267 and of the track elements 270 which include the end regions 271 and the connecting regions 286. The tripod arms 274 deviate from the designs shown in FIGS. 9 and 10 in that they have a spherical shaped portion. On the tripod arms, in the form of a spherical portion, roller carrier elements 287 are guided such that they are pivotable and axially movable relative to the arm axis. The needle bearings 275 supporting the tripod rollers 276 are guided directly on the roller carrier elements 287. As a result of the design of the track elements 270, the tripod rollers 276 and the roller carriers 287, in this case, are not pivotable relative to the outer joint part. However, the rollers and carrier elements are not pivotable directly relative to the track elements 270, as in the case of the above-described embodiments, but they are pivotable relative to the respective arm axes $A_1$–$A_3$.

Figure 13:
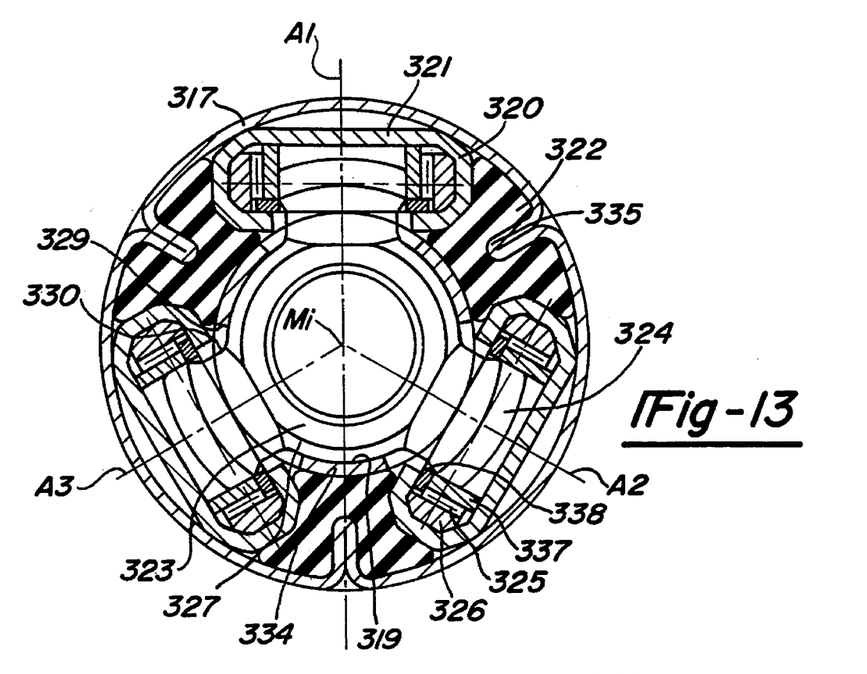
FIG. 13 is a cross-section view through another embodiment of a joint according to the present invention with a sleeve-like centering mechanism.
Figure 14:
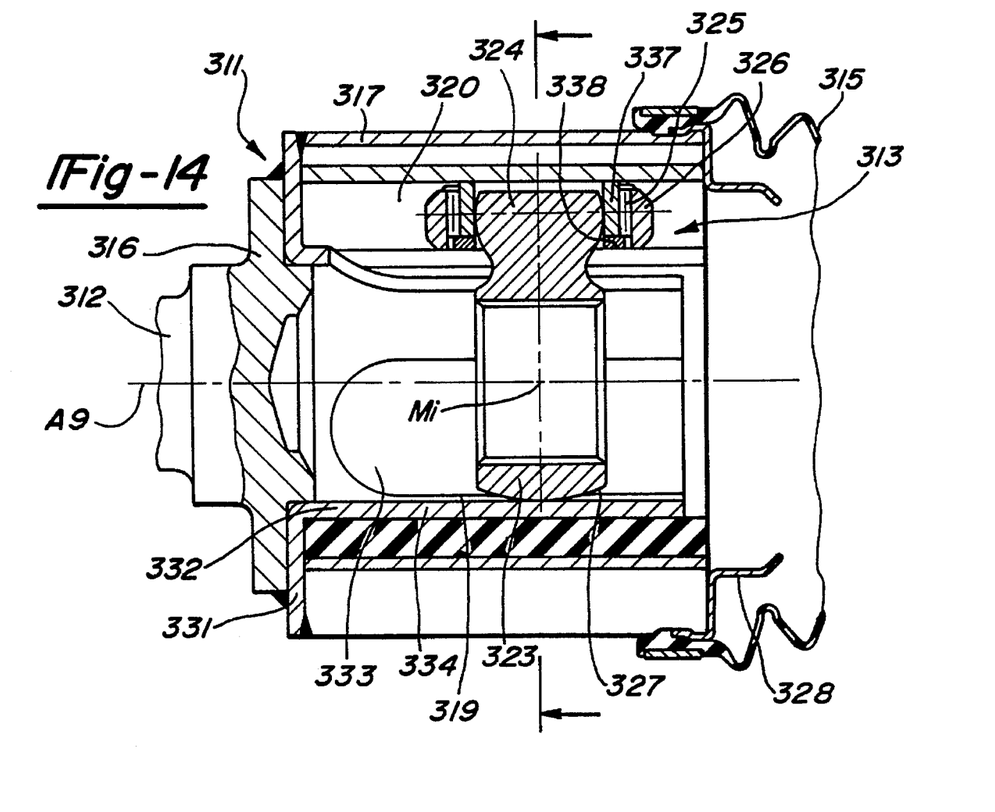
FIG. 14 is a longitudinal section view through a joint according to FIG. 13.

In FIGS. 13 and 14, the reference numbers of any details corresponding to those shown in FIGS. 9 and 10 have been increased by 100 and those corresponding to FIGS. 11 and 12 have been increased by So. FIGS. 13 and 14 largely correspond to the embodiments shown in FIGS. 11 and 12. However, the track elements 320 differ in that, again, they are designed as individual elements which are independent of one another. In the extended position, the track elements 320 with the edges of their head regions 321 are supported on the annular member 317. Out of this position, the track elements are resiliently displaceable in the circumferential direction and radially inwardly. The supporting members 322 are not only inserted between the track members and the annular member, but are radially inwardly supported on the outside of the guiding regions 334 of the guiding sleeve 332.

Figure 15:
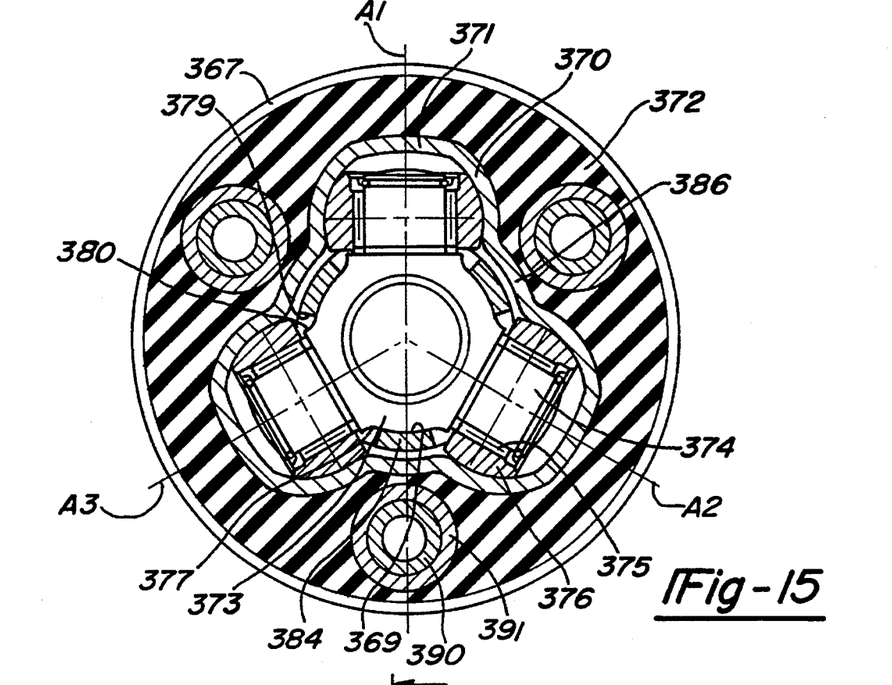
FIG. 15 is a cross-section view through another embodiment of a joint according to the present invention with a sleeve-like centering mechanism.
Figure 16:
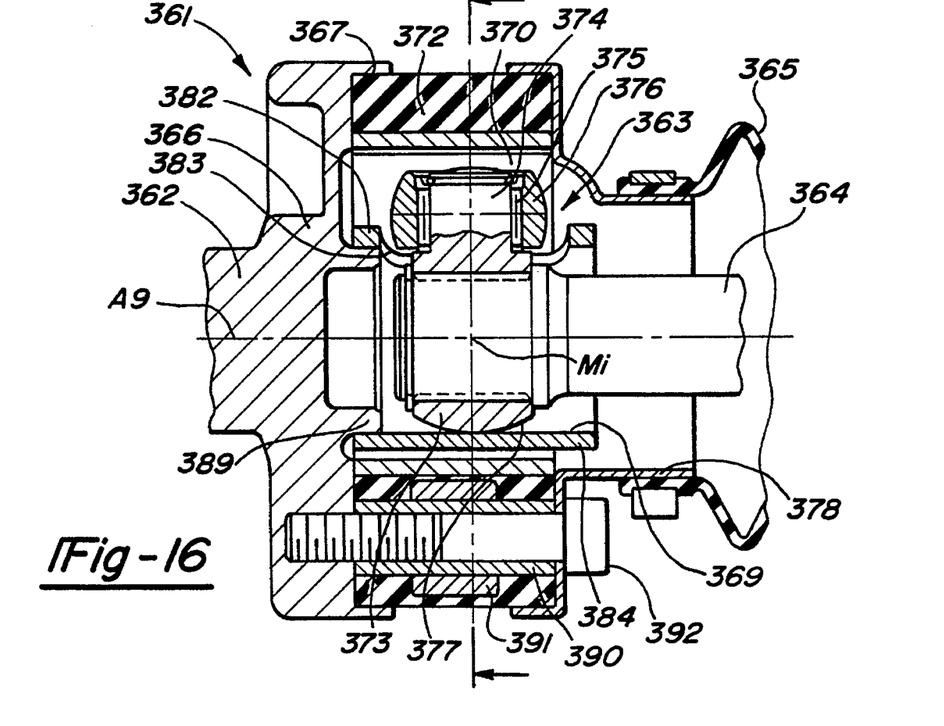
FIG. 16 is a longitudinal section view through a joint according to FIG. 15.

In FIGS. 15 and 16, the outer joint part includes several components. A solid base 366 is designed to be integral with a first driveshaft 362. An annular member 367, only part of which is shown, is formed on at the base 366. Further, the base 366 includes a cylindrical projection 389. A guiding sleeve 382 with circumferentially distributed, longitudinally extending slots 383 is positioned on the cylindrical projection 389. Between the slots there remain web-like guiding regions 384 which form inner cylindrical guiding faces 369. Track elements 370, connected to one another via connecting regions 386 to form a closed annular element, are inserted into the annular member 367, only part of which is shown. The track elements are fully formed into an annular resilient supporting member 372. Spacing sleeves 390 with stop sleeves 391 slid thereon, are also formed into the supporting member 372 between two track elements 370. The sleeves 390 and thus the supporting member 372 are tensioned to the base 366 of the outer joint part via bolts 392. The bolts 392 also hold a plate metal element 378 which partially embraces the supporting member 372. The slid-on stop sleeves 391 limit the relative rotational movement of the track elements 370 relative to the annular member 367 under an overload torque 366. The intermediate regions 386 of the track elements, towards the inside, are arranged at a radial distance from the guiding regions 384 of the sleeve element 382.

The inner joint part includes an annular central member 373 into which a second driveshaft 374 is inserted. The means for non-rotatingly connecting and axially securing the inner joint part and driveshaft relative to one another will not be discussed in detail. Three circumferentially distributed tripod arms 374 are attached to the central member 373. Tripod rollers 376 are rotatably supported on the tripod arms 374 via needle bearings 375. The means for axially securing the needle bearings on the tripod arms tripod rollers are not discussed in greater detail. The 376 are axially movable on the tripod arms 374, via the needle bearings 375, relative to the respective arm axis. Between each of the tripod arms 374, the central member 373 includes a guiding face 377 with a spherical shaped portion which cooperates with the guiding faces 369 at the guiding regions 384 of the sleeve 382. The tripod with the central member and the arms should preferably be threaded into the sleeve prior to mounting the rollers. Preferably, the sleeve 382 is already secured on the annular projection 389. Again, the above-mentioned plate metal element 378 serves as an axial stop for the inner joint part. The guiding regions 384 include stop edges 379 which are able to cooperate with the corresponding stops 380 in the base region of the tripod arms 374 upon relative rotation of the joint under an overload torque. The axially limited length of the slots 383 provides the guiding sleeve 382 with increased stiffness.

Figure 17:
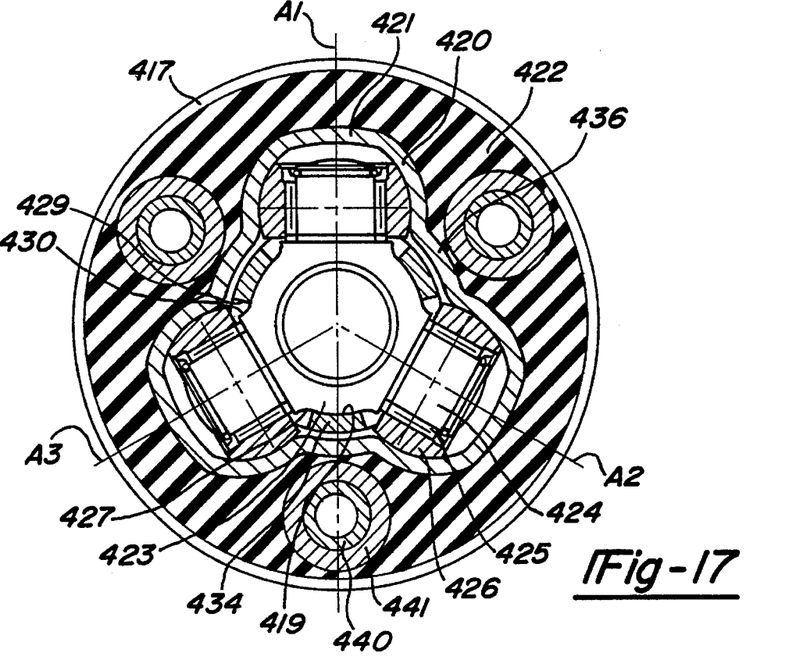
FIG. 17 is a cross-section view through a joint similar to that shown in FIG. 15, with a modified outer joint part.
Figure 18:
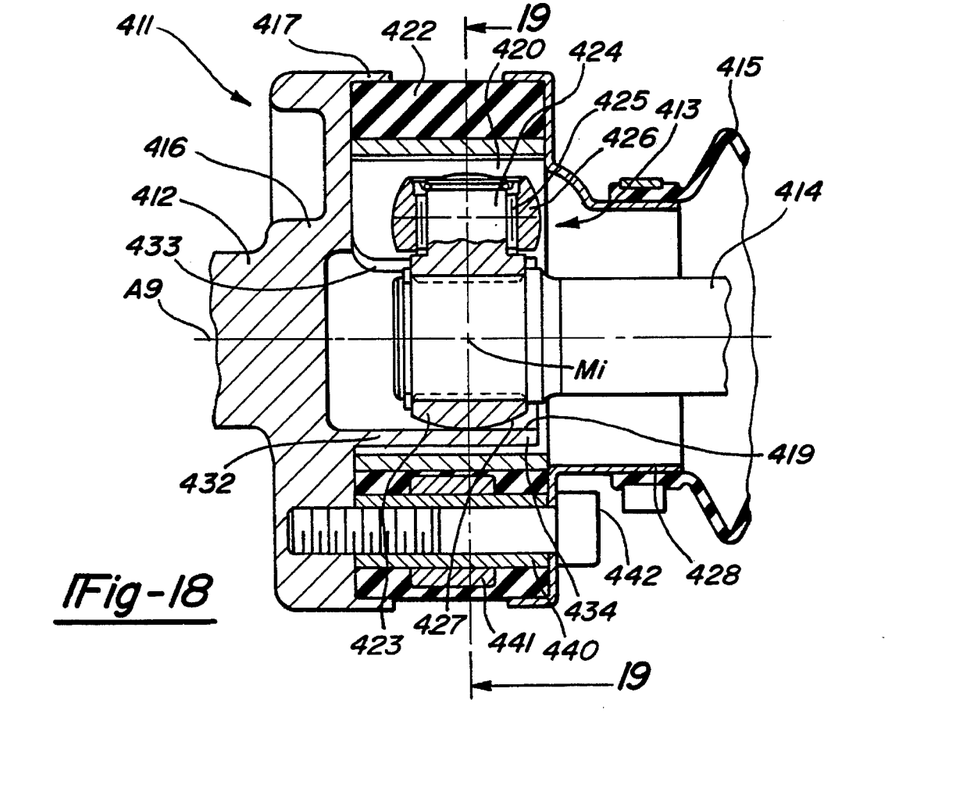
FIG. 18 is a longitudinal section view through a joint according to FIG. 17.

In FIGS. 17 and 18, the reference numbers of any details corresponding to those shown in FIGS. 15 and 16 have been increased by 50. To that extent, reference is made to the description of FIGS. 15 and 16. The slots 433 deviate from the illustration of FIGS. 15 and 16 in that they extend as far as the end of the guiding sleeve 432, which is formed on to be integral with the base 416.

Figure 19:
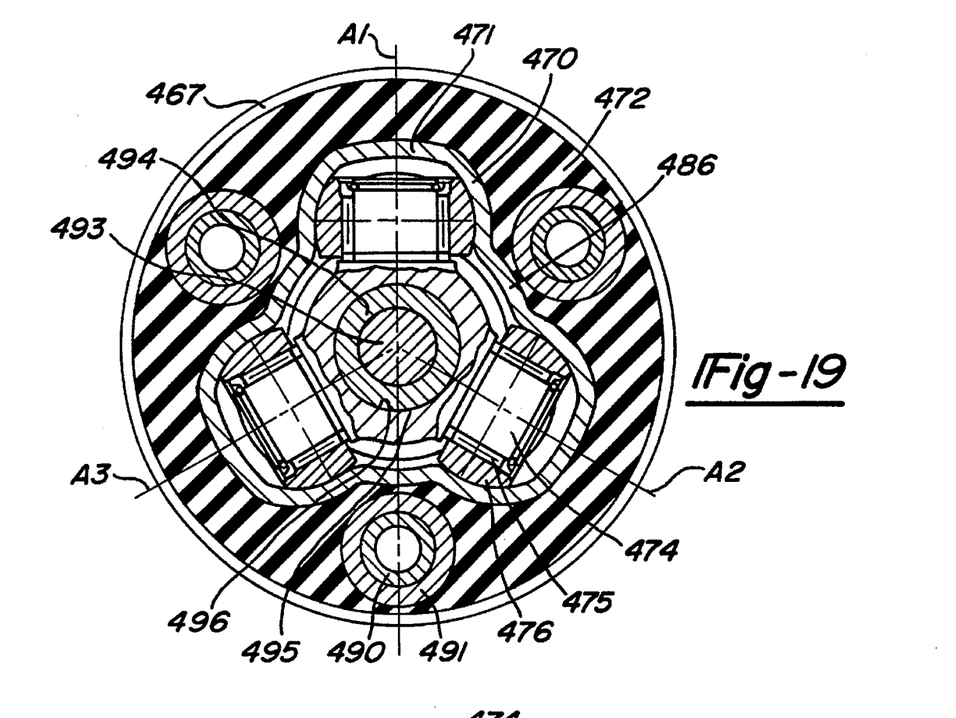
FIG. 19 is a cross-section view through a joint similar to that shown in FIG. 15, with a modified outer joint part.
Figure 20:
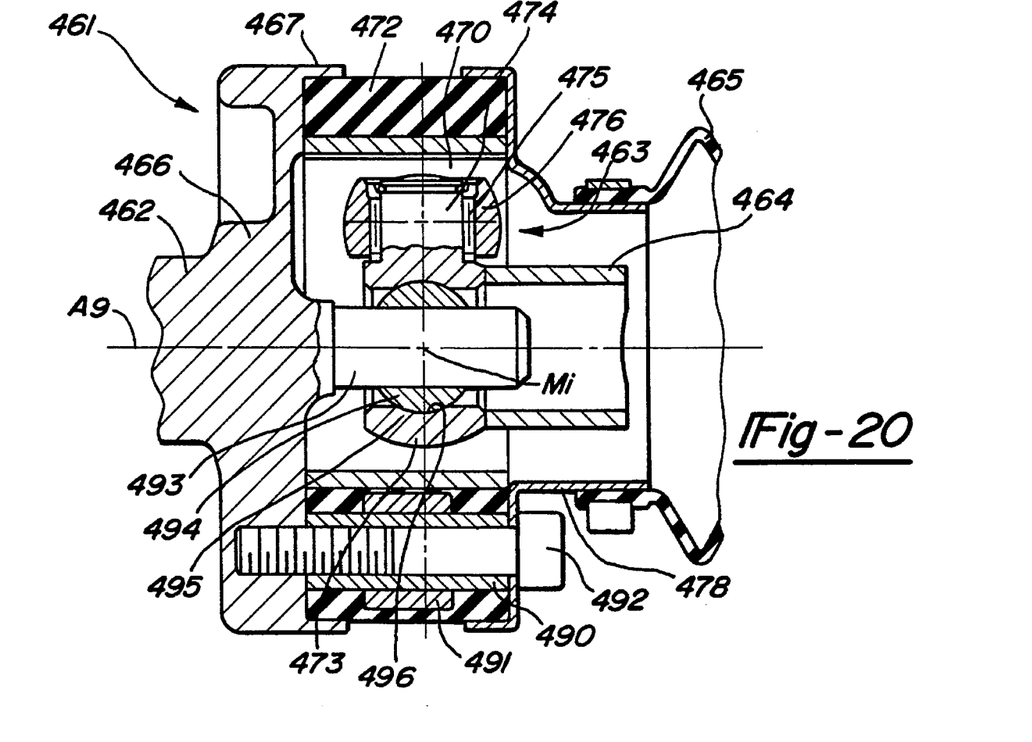
FIG. 20 is a longitudinal section view through a joint according to FIG. 19.

In FIGS. 19 and 20, the reference numbers of any detail corresponding to those shown in FIGS. 15 and 16 have been increased by 100. To that extent, reference is made to the description of FIGS. 15 and 16. Instead of a guiding sleeve, a journal 493 is provided which is attached to the base. An annular member 494 with an externally spherical surface 495 is axially movably held on the base. The annular member engages a calotte face 496 in the central member 473 of the inner joint part. The shaft 464 is designed as a hollow shaft. The center $M_i$ of the tripod, predetermined by the point of intersection of the arm axes $A_1$–$A_3$ is always centered on the axis $A_G$ of the outer joint part.

Figure 21:
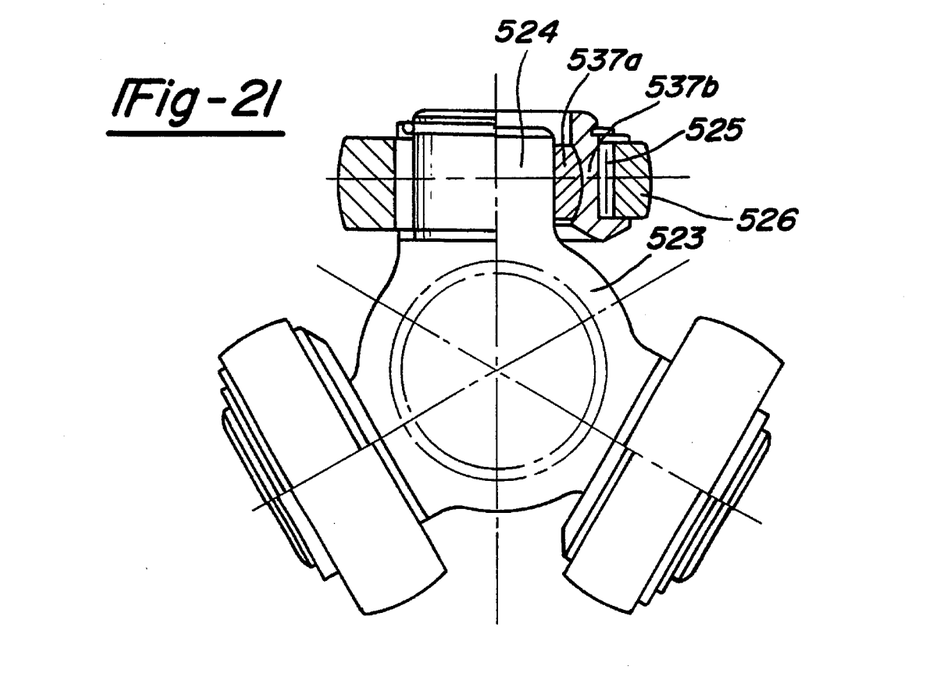
FIG. 21 is an elevational view partially in cross-section of an inner joint part with a first modified roller bearing design.

FIG. 21 shows a further embodiment of the inner joint part where the kinematic conditions between the central element 523 and the tripod rollers 526 are the same as those prevailing in FIGS. 11 to 14. Thus, in FIG. 21, the joint design can be assumed to be the same as that referred to in FIGS. 11 to 14. The tripod arms 524 deviate from the latter in that, they are designed to be cylindrical with a two-part roller carrier being axially movably guided thereon with reference to the arm axis. The roller carrier has an inner annular member 537a with an internally cylindrical face corresponding to the arm diameter, an externally spherical face, an outer annular member 537b with an inner calotte and an outer cylindrical face. In this way, the tripod roller 526 is supported directly via a needle bearing 525. The needle bearing and tripod roller are axially secured relative to the outer annular member 537b of the roller carrier.

Figure 22:
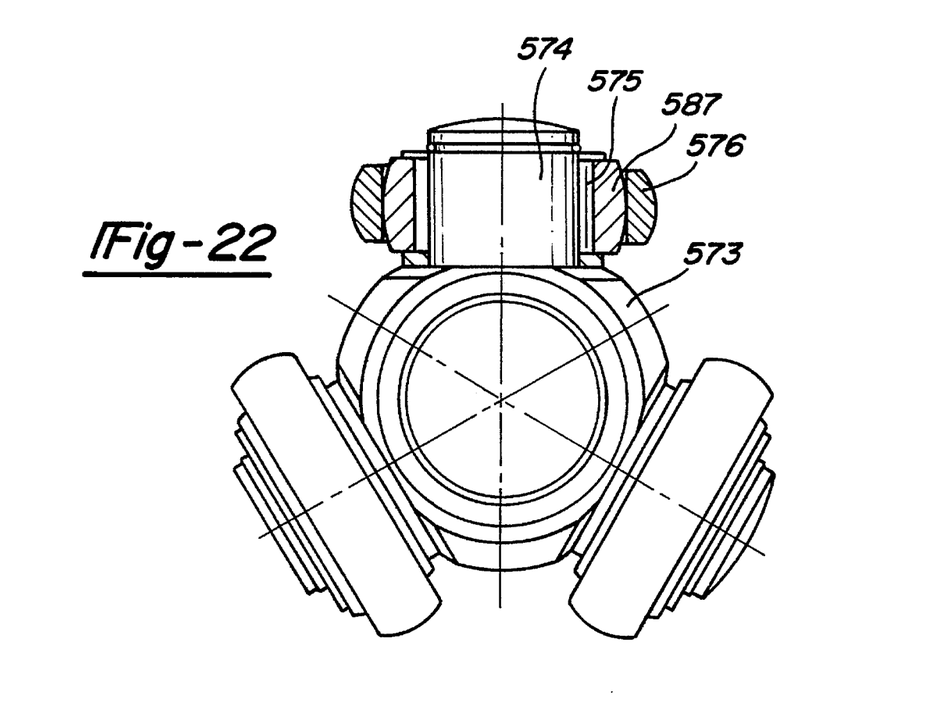
FIG. 22 is an elevational view partially in cross-section of an inner joint part with a second modified roller bearing design.

FIG. 22 shows a further embodiment of the inner joint part where the kinematic conditions between the central element 573 and the tripod rollers 576 are the same as those prevailing in FIGS. 11 to 14. Thus, in FIG. 22, the joint design can be assumed to be the same as that referred to in FIGS. 11 to 14. The tripod arms deviate from the latter in that they are designed to be cylindrical with a needle bearing 575 provided directly thereon. An inner roller 587, with an externally spherical surface, is running on the needle bearing 575. On the inner roller, the tripod roller 576 is pivotally guided axially movable relative to the arm axis. The inner roller and the needle bearing 575 are axially secured relative to the tripod arm 574.

I claim:

1. A tripod joint comprising:

an outer joint part with three circumferentially distributed longitudinally extending tracks for receiving rollers, said outer joint part being non-rotatingly connected to a first driveshaft:

an inner joint part having three radial arms which engage the tracks and on which the rollers are rotatably and radially movably supported, said inner joint part being non-rotatingly connectable to a second driveshaft;

said outer joint part comprising:

an outer annular member directly and firmly connected to the first driveshaft;

track elements coupled with said annular member directly guiding the rollers, wherein the track elements of the outer joint part are independent of one another, wherein said track elements form the tracks for one single tripod roller respectively and are circumferentially independently movable from one another and resilient intermediate elements being arranged between said outer annular member and said track elements, said resilient intermediate elements enabling torque transmission; and means for ensuring mutual centering of said annular member of the outer joint part and said inner joint part.

2. A joint according to claim 1, wherein said inner joint part, between the attached arms, includes a part-spherical surface, with said centering means connected to the annular member directly cooperating therewith.

3. A joint according to claim 2, wherein the centering means connected to the annular member including radially inwardly directed axially extending webs, engaging a space between each two of the arms of the inner joint part.

4. A joint according to claim 2, wherein the centering means connected to the annular member is an axially extending coaxial centering sleeve including longitudinally extending slots enabling the arms of the inner joint part to pass through.

5. A joint according to claim 1, wherein said centering means connected to the annular member including a coaxial central journal with an externally spherical annular member being axially movable thereon and engaging a central calotte face in the inner joint part.

6. A joint according to claim 1, including anti-rotation stops between the annular member of the outer joint part and the inner joint part.

7. A joint according to claim 6, wherein the anti-rotation stops are annular members slid on to the arms underneath the rollers and which cooperate with the centering means.

8. A joint according to claim 1, including anti-rotation stops between the annular member and the track elements of the outer joint part.

9. A joint according to claim 8, wherein the anti-rotation stops are arranged on screw-receiving sleeves passing through one-piece resilient elements which receive the track elements and are screwed to the annular member.

10. A joint according to claim 1, wherein when the joint is in the aligned condition, the track elements, which are independent of one another, with their radial outside rest against the annular member.

11. A tripod joint comprising:

an outer joint part with three circumferentially distributed longitudinally extending tracks for receiving rollers, said outer joint part being non-rotatingly connected to a first driveshaft;

an inner joint part having three radial arms which engage the tracks and on which the rollers are rotatably and radially movably supported, said inner joint part being non-rotatingly connectable to a second driveshaft;

said outer joint part comprising:

an outer annular member directly and firmly connected to the first driveshaft;

track elements coupled with said annular member directly guiding the rollers, wherein the track elements are a closed annular part, which closed annular part is orbitally movable relative to the axis of the annular member;

and resilient intermediate elements being arranged between said outer annular member and said track elements, said resilient intermediate elements enabling torque transmission; and means for ensuring mutual centering of said annular member of the outer joint part and said inner joint part.

12. A joint according to claim 11, wherein said inner joint part, between the attached arms, includes a part-spherical surface, with said centering means connected to the annular member directly cooperating therewith.

13. A joint according to claim 12, wherein the centering means connected to the annular member including radially inwardly directed axially extending webs, engaging a space between each two of the arms of the inner joint part.

14. A joint according to claim 12, wherein the centering means connected to the annular member is an axially extending coaxial centering sleeve including longitudinally extending slots enabling the arms of the inner joint part to pass through.

15. A joint according to claim 11, wherein said centering means connected to the annular member including a coaxial central journal with an externally spherical annular member being axially movable thereon and engaging a central calotte face in the inner joint part.

16. A joint according to claim 11, including anti-rotation stops between the annular member of the outer joint part and the inner joint part.

17. A joint according to claim 16, wherein the anti-rotation stops are annular members slid on to the arms underneath the rollers and which cooperate with the centering means.

18. A joint according to claim 11, including anti-rotation stops between the annular member and the track elements of the outer joint part.

19. A joint according to claim 18, wherein the anti-rotation stops are arranged on screw-receiving sleeves passing through one-piece resilient elements which receive the track elements and are screwed to the annular member.

* * * * *